United States Patent
Bollig et al.

(10) Patent No.: US 8,326,520 B2
(45) Date of Patent: Dec. 4, 2012

(54) PROCESS FOR AUTOMATICALLY TURNING OFF AND STARTING AN INTERNAL-COMBUSTION ENGINE

(75) Inventors: Marcus Bollig, Munich (DE); Juergen Poggel, Grasbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/157,088

(22) Filed: Jun. 9, 2011

(65) Prior Publication Data

US 2011/0238284 A1 Sep. 29, 2011

Related U.S. Application Data

(63) Continuation of application No. PCT/EP2009/008482, filed on Nov. 28, 2009.

(30) Foreign Application Priority Data

Dec. 11, 2008 (DE) .......................... 10 2008 061 790

(51) Int. Cl.
*F02D 28/00* (2006.01)
(52) U.S. Cl. ...................... 701/113; 701/102; 123/179.4
(58) Field of Classification Search .......... 701/102–105, 701/112–115; 180/65.28; 477/3, 183, 185, 477/199, 200, 203–207, 209–211; 903/905
See application file for complete search history.

(56) References Cited

U.S. PATENT DOCUMENTS

| | | | |
|---|---|---|---|
| 4,630,577 A | 12/1986 | Cornacchia | |
| 6,135,920 A * | 10/2000 | Kamiya et al. | 477/185 |
| 6,275,759 B1 | 8/2001 | Nakajima et al. | |
| 6,466,860 B2 * | 10/2002 | Kaneko | 701/112 |
| 6,504,259 B1 * | 1/2003 | Kuroda et al. | 290/40 C |
| 6,540,644 B2 * | 4/2003 | Morimoto et al. | 477/102 |
| 6,676,565 B2 | 1/2004 | Mizutani | |
| 6,730,000 B1 | 5/2004 | Leising et al. | |
| 7,041,030 B2 * | 5/2006 | Kuroda et al. | 477/21 |
| 7,458,353 B2 * | 12/2008 | Takahashi | 123/179.4 |
| 7,530,434 B2 | 5/2009 | Bitter | |

(Continued)

FOREIGN PATENT DOCUMENTS

DE 100 23 331 A1 6/2001

(Continued)

OTHER PUBLICATIONS

German Search Report dated Feb. 8, 2010 including partial English-language translation (Nine (9) pages).

(Continued)

*Primary Examiner* — John Kwon
*Assistant Examiner* — Johnny Hoang
(74) *Attorney, Agent, or Firm* — Crowell & Moring LLP

(57) ABSTRACT

A process and a corresponding system are provided for automatically turning off and starting an internal-combustion engine in a motor vehicle via a start-stop device, which automatically turns off the internal-combustion engine if the vehicle is braked to a stop and is held in the stopped position by the operation of the brake pedal, and which, if the internal-combustion engine is automatically turned off and the operated brake pedal is released, automatically starts the internal-combustion engine. If the internal-combustion engine is automatically turned off, an automatic starting of the internal-combustion engine by releasing the brake is prevented if the brake pedal was increasingly depressed beforehand while the internal-combustion engine was turned-off.

14 Claims, 1 Drawing Sheet

U.S. PATENT DOCUMENTS

| | | | |
|---|---|---|---|
| 7,678,021 B2 * | 3/2010 | Baur et al. | 477/183 |
| 7,941,252 B2 | 5/2011 | Medema et al. | |
| 2001/0013701 A1 * | 8/2001 | Onoyama et al. | 290/40 C |
| 2003/0004635 A1 * | 1/2003 | Kamiya et al. | 701/112 |
| 2003/0135321 A1 * | 7/2003 | Kumazaki et al. | 701/112 |
| 2003/0173124 A1 * | 9/2003 | Okada et al. | 180/65.2 |
| 2004/0153235 A1 * | 8/2004 | Kataoka et al. | 701/112 |
| 2005/0143901 A1 * | 6/2005 | Scholt et al. | 701/112 |
| 2006/0142928 A1 * | 6/2006 | Yuya et al. | 701/112 |
| 2006/0186738 A1 * | 8/2006 | Noguchi et al. | 307/10.1 |
| 2007/0000712 A1 * | 1/2007 | Kamiya | 180/287 |
| 2007/0054773 A1 | 3/2007 | Braun et al. | |
| 2007/0199745 A1 * | 8/2007 | Hayashi | 180/65.2 |
| 2008/0201064 A1 | 8/2008 | DiGonis | |
| 2009/0138184 A1 * | 5/2009 | Terada | 701/112 |
| 2009/0319161 A1 * | 12/2009 | Abendroth | 701/112 |
| 2010/0076656 A1 * | 3/2010 | Hiyoshi et al. | 701/70 |
| 2010/0114461 A1 * | 5/2010 | Gibson | 701/112 |

FOREIGN PATENT DOCUMENTS

| | | |
|---|---|---|
| DE | 102 11 466 C1 | 8/2003 |
| DE | 102 11 463 B3 | 1/2004 |
| DE | 10 2006 028 336 A1 | 12/2006 |
| DE | 10 2007 010 488 A1 | 9/2008 |
| EP | 0 158 605 A1 | 10/1985 |
| EP | 0 158 605 B1 | 7/1988 |
| EP | 1 469 195 A1 | 10/2004 |
| EP | 1 553 189 A1 | 7/2005 |
| EP | 1 612 408 A1 | 1/2006 |
| EP | 1 469 195 B1 | 9/2006 |
| GB | 2 427 440 A | 12/2006 |
| JP | 2000-250873 A | 9/2000 |
| JP | 2004-183519 | 7/2004 |
| WO | WO 2004/091961 A1 | 10/2004 |

OTHER PUBLICATIONS

International Search Report dated Mar. 9, 2010 including English-language translation (Six (6) pages).

* cited by examiner

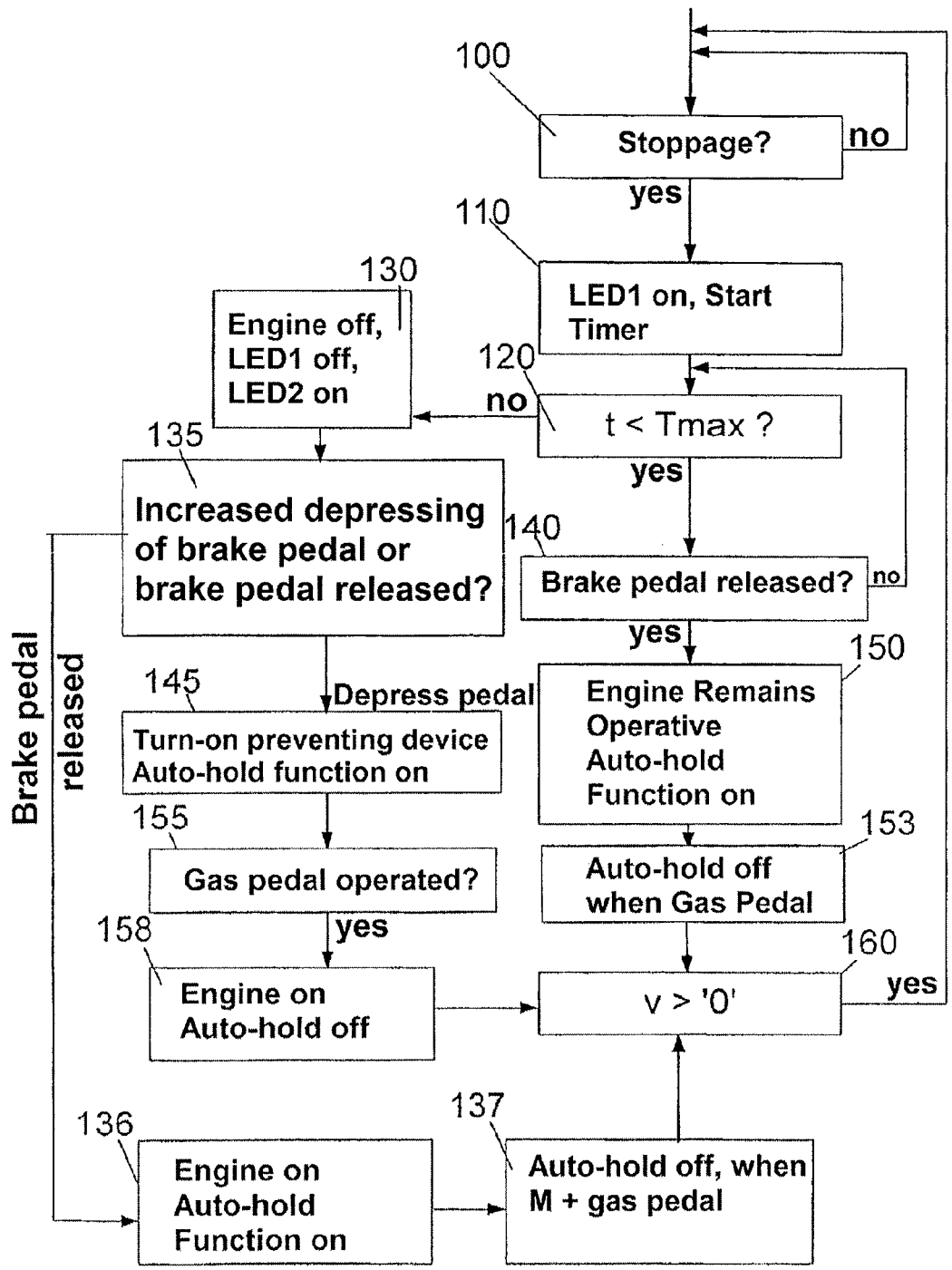

PROCESS FOR AUTOMATICALLY TURNING OFF AND STARTING AN INTERNAL-COMBUSTION ENGINE

CROSS-REFERENCE TO RELATED APPLICATIONS

This application is a continuation of PCT International Application No. PCT/EP2009/008482, filed Nov. 28, 2009, which claims priority under 35 U.S.C. §119 from German Patent Application No. DE 10 2008 061 790.3, filed Dec. 11, 2008, the entire disclosures of which are herein expressly incorporated by reference.

BACKGROUND AND SUMMARY OF THE INVENTION

The invention relates to a process for automatically turning off and starting an internal-combustion engine in a vehicle.

Internal-combustion engines are currently mostly turned off manually by the driver by means of an ignition key. A process that was disclosed in German Patent Document DE 100 23 331 A1 represents an exception. In DE 100 23 331 A1, the brake pedal position or the brake pedal pressure is analyzed instead of the ignition key. The turn-off operation of the internal-combustion engine is initiated if, after the motor vehicle has come to a stop, the brake pedal is actuated more in its already actuated position. For continuing the drive, the brake pedal is released and the gas pedal is depressed, after which a start of the internal-combustion engine is initiated. Such a process has the disadvantage that only the motor vehicle driver is responsible for turning off the internal-combustion engine. Analyses of today's vehicle handling show that, despite a raised environmental awareness and higher fuel prices, a manual turning-off of the internal-combustion engine, for example, at traffic lights, rarely takes place independently.

In order to reduce the fuel consumption and pollutant emissions, processes and systems are currently being developed and partly already used which automatically turn off the internal-combustion engine of a motor vehicle under certain conditions or when predefined turn-off conditions exist, and automatically turn it on again under predefined turn-on conditions. Such processes and systems, also known as "start-stop" devices, are mainly suitable for city traffic for reducing the fuel consumption because, in city traffic, the vehicle often comes to a stop at traffic lights or as a result of traffic and the operation of the internal-combustion engine is not necessary.

From EP 0 158 605 B1, for example, a system is disclosed which causes a turning-off and a restarting of the internal-combustion engine as a function of various conditions. One condition for initiating an automatic turn-off operation is, for example, that the vehicle speed has to be below a limit value for a certain time before the internal-combustion engine is automatically turned off.

It is a disadvantage of such processes and systems that the actual traffic situation cannot be taken into account. The internal-combustion engine is therefore turned off also in situations in which the driver does not want it to be turned off for reasons of comfort. For example, an automatic turning-off of the internal-combustion engine is not desirable on a turn lane or at a stop sign if it is immediately possible to continue the drive. Particularly in the case of vehicles with an automatic transmission, provided that the internal-combustion engine is automatically turned off to a stop during a braking operation, the driver cannot prevent an automatic turn-off operation. When a cost-effective pinion starter is used as a starting system, an engaging, thus a starting of the running internal-combustion engine, is not possible or is possible only with a loss of comfort for the driver. Under certain circumstances, this may also result in longer starting times.

In order to avoid this problem, processes and systems are known in which the driver can prevent an automatic turn-off. Thus, EP 1 469 195 B1 discloses a process for the automatic turning-off of an internal-combustion engine in a vehicle, where the driver can prevent the automatic turn-off operation within a predefined time interval after coming to a stop. For example, the automatic turn-off operation will not be initiated if the driver increasingly steps on the brake pedal within the predefined time interval after coming to a stop.

It is a disadvantage of the above-mentioned process that, for the entire duration while the internal-combustion engine is switched off, the driver has to hold the brake pedal in the depressed position in order not to initiate an (unwanted) start of the internal-combustion engine. Under certain circumstances, this may result in a loss of comfort for the driver. It may further have the result that the driver intentionally allows the internal-combustion engine to automatically start earlier than necessary in order to be able to remove his foot from the gas pedal.

It is an object of the invention to improve a process for automatically turning off and starting an internal-combustion engine in a vehicle in such a manner that, when the internal-combustion engine is turned off, the driver does not constantly have to hold the brake pedal in a depressed position and will nevertheless prevent a rolling-away of the vehicle without continuously operating the brake pedal.

According to the invention, this and other objects are achieved by a process for automatically turning off and starting an internal-combustion engine in a motor vehicle, particularly in a motor vehicle having an automatic transmission, by use of a start-stop device which automatically turns off the internal-combustion engine when the vehicle is braked to a stop and is held in the stopped position by operation of the brake pedal, and which, when the internal-combustion engine is automatically turned off and the operated brake pedal is released, automatically starts the internal-combustion engine. When the internal-combustion engine is automatically turned off, an automatic starting of the internal-combustion engine by releasing the brake is prevented if the brake pedal is increasingly depressed beforehand while the internal-combustion engine was turned-off.

In the case of a process according to the invention for automatically turning off and starting an internal-combustion engine in a motor vehicle by use of a start-stop device, an automatic turn-off operation will, in principle, be initiated when the vehicle was braked to a stop by the driver and was held in the stopped position (as required, for a predefined time interval). A stoppage of the vehicle is recognized when the vehicle speed is at least almost zero or exactly zero. If the vehicle is held in the stopped position by operating the brake pedal (ideally for a predefined time interval), the internal-combustion engine will automatically be turned off by the start-stop device. The start-stop device may, for example be an independent control device or may be integrated in the engine control unit.

If the process for automatically turning off and starting the internal-combustion engine is further developed such that the internal-combustion engine, which is automatically turned off as a result of the braking and holding of the vehicle in the stopped position, will, in principle, be automatically started again when the driver removes his foot from the brake pedal, the driver has to continuously operate the brake for maintaining the stoppage. According to the invention, it is therefore provided that, when the internal-combustion engine is automatically turned off, an automatic starting of the internal-combustion engine during the release of the brake pedal will be prevented if beforehand, while the internal-combustion engine is turned off, the driver increasingly depresses the brake pedal. This means that, as a result of the increased depressing, a turn-on prevention device is activated, so that, when the brake pedal is subsequently released while the internal-combustion engine is automatically turned off, no automatic start of the internal-combustion engine is initiated. Also in the case of such a function logic for automatically turning-off and starting the internal-combustion engine, the driver can therefore take his foot off the brake pedal when the internal-combustion engine is automatically turned off and can wait in a relaxed manner until he can start driving again.

This process is particularly advantageous for vehicles with automatic transmissions because, as a rule, the driver here leaves the gear shift lever in the normal position when the vehicle is stopped and no clutch pedal is present which could be analyzed with respect to the driver's intention. The term "automatic transmission", in addition to the conventional automatic transmissions, also includes all at least partially automated transmissions, including double clutch transmissions (transmissions with and without converters, EGS, SMG). However, this process can also be used in the case of vehicles with manual transmissions.

In order to be able to hold the vehicle in the stopped position without a continuous operation of the brake pedal when the internal-combustion engine is turned off, according to the invention, a holding function for the automatic holding of the vehicle in the stopped position is activated either by a corresponding action of the driver or in the case of the existence of a certain event. The driver can take his foot off the brake pedal without the risk that the vehicle rolls away, for example, due to the slope of the road.

At the earliest, the holding function can be activated when the motor vehicle has come to a stop. As an alternative, it can also only be activated as soon as the internal-combustion engine is automatically turned off, or when the driver, for activating the above-mentioned turn-on prevention device, steps more intensely on the brake pedal when the internal-combustion engine is turned off. In order to prevent a rolling-away of the vehicle when the driver (while the internal-combustion engine is turned off) releases the brake, the holding function, in the case of a preceding activating of the turn-on prevention device (no turning-on when releasing the brake) should be automatically activated at the latest when the brake pedal is released.

The term "holding function" includes all functions or interventions in the vehicle control which prevent at least a forward and backward movement of the vehicle. When the driver reduces the brake pressure by releasing the brake pedal and prevents the automatic turn-off operation of the internal-combustion engine within the predefined time interval, the creep function of the vehicle generated by way of a hydraulic converter can be deactivated, for example, for maintaining the stoppage of the vehicle in the sense of an activating of a holding function. In addition or as an alternative, the vehicle can simultaneously be held in the stopped position by a braking intervention that can be automatically activated during the stoppage; i.e. parking brake functions, for example, are activated for the temporary holding of an operationally ready motor vehicle in the stopped position. Such braking interventions or functions and the corresponding systems are known, for example, under the names "starting assistant", "hill assistant", "hillhold(er)", "automatic hold" or within the scope of cruise control systems with a range holding function to the stopped position. These systems preventing the rolling of the operationally ready motor vehicle are, for example, constructed as electro(hydraulic), (electro)pneumatic or, as required, also electro-mechanical, or electronically controllable braking systems, by which the holding and the prevention of the rolling of the operationally ready motor vehicle can be carried out temporarily.

Processes are also known in the case of which the rolling of the vehicle is prevented by way of the transmission (particularly an automatic transmission) or by a corresponding transmission function. Accordingly, as an alternative or in addition to the braking intervention or to the deactivating of an existing creep function, as the holding function, a so-called auto-P-function for holding the vehicle in the stopped position can be activated.

If, when the internal-combustion engine is turned off, the driver has set the turn-on prevention device and released the brake pedal, he can initiate the automatic start of the internal-combustion engine—advantageously in the case of vehicles with automatic transmissions or at least partially automatic transmissions—in that he operates the gas pedal. The internal-combustion engine will then be started again and he can start driving. For detecting the gas pedal operation, analogous to a brake light switch in the brake pedal, a switch can be installed in the gas pedal which detects an operation of the gas pedal early.

In order to be able to prevent or at least reduce an unnecessary time delay between the gas pedal operation and the driving start, a foot space sensor system can ideally be provided in the vehicle, by which a gas pedal operation and thereby the desire to start driving can be recognized early. In the simplest manner, the foot space sensor system can be further developed as a distance sensor for detecting the distance of the foot from the gas pedal. When there is a falling below a predefined distance from the gas pedal, the internal-combustion engine will be started automatically.

If a holding function was automatically activated in the run-up, the activated holding function should automatically be deactivated again with the operation of the gas pedal. In order to prevent the vehicle from rolling away before sufficient drive torque can be made available, the holding function activated, for example, because of an increased operation of the brake pedal for activating the turn-on prevention device, will be deactivated when the internal-combustion engine automatically switched off after the predefined time interval after coming to a stop is automatically turned on, and/or when the gas pedal is operated, and/or when the internal-combustion engine provides a sufficiently high drive torque for holding the vehicle in the stopped position.

In order to, for example, at stop signs, make it possible for the driver to prevent an automatic turning-off of the internal-combustion engine despite the braking and the holding in the stopped position, after coming to a stop the driver should be provided within a predefined time interval with the possibility of preventing the automatic turn-off operation. An automatic turning-off of the internal-combustion engine can, for example, be prevented in that, within the predefined time period after coming to a stop, the driver releases the brake pedal, thus, by the corresponding operation of the brake pedal, reduces the brake pressure applied by the brake pedal. In order to be able to detect a releasing of the brake pedal, for example, a signal of a (brake light) switch arranged in the brake pedal can be analyzed. If the brake pressure generated by the brake pedal, the braking torque, or the corresponding gradient is to be analyzed, the brake pressure or the torque can be determined, for example, by means of a corresponding sensor.

When the driver reduces the brake pressure by releasing the brake pedal and prevents the automatic turn-off operation of the internal-combustion engine within the predefined time interval, the creep function of the vehicle generated by way of a hydraulic converter can be deactivated for maintaining the stoppage of the vehicle, and the vehicle can simultaneously be held in the stopped position by a braking intervention that can be automatically activated during the stoppage; i.e. parking brake functions are activated for the temporary holding of an operationally ready motor vehicle in the stopped position.

If, within the predefined time interval from coming to a stop, the driver does not release the brake pedal, the internal-combustion engine will be automatically turned off after the expiration of the time interval. Provided that the driver has not increasingly operated the brake pedal, the automatically turned-off internal-combustion engine is advantageously automatically turned on again: (1) if the driver releases the brake pedal, (2) if the brake pressure applied by the driver falls below a predefined brake pressure threshold value, (3) if the braking torque applied by the driver falls below a predefined braking torque threshold value, (4) if the negative braking gradient reached during the release of the brake pedal (braking torque gradient or brake pressure gradient) reaches or exceeds a predefined braking gradient threshold value, and/or (5) if the driver operates the gas pedal. When the driver has activated the brake release turn-on prevention device by an increased stepping on the brake pedal, a release of the brake will not result in the start of the internal-combustion engine. A start will then only take place if the driver operates the gas pedal or a time-proximal gas pedal operation can be assumed.

In order to avoid having the vehicle roll away before the start of the internal-combustion engine,—as indicated above—when the internal-combustion engine is turned off, at the latest with the release of the brake pedal or with the reduction of the brake pressure applied by the driver, a holding function or parking brake function, particularly an auto-holding function, can simultaneously be activated. The latter will remain active until the drive unit is started and the vehicle starts to move or could start to move because of the gas pedal operation.

Advantageously, the motor vehicle driver may be informed by way of a first indicating element as soon as he can prevent the automatic turning-off of the internal-combustion engine. If the predefined operating conditions have been met; i.e., the vehicle was braked to a stop and all other conditions have also been met, for example, an LED will light up which signals to the driver that the internal-combustion engine will shortly be turned off by the start-stop device. However, a loudspeaker for an acoustic signal or other elements for visual or haptic signals may also be used as indicating elements. As an alternative or in addition, a second indicating element can then be activated when the internal-combustion engine was automatically turned off. The second indicating element can then be further developed such that it informs the driver as to how or by which action he can again trigger the start of the internal-combustion engine. If this is possible, for example, by releasing the brake pedal, a brake pedal symbol can be displayed from which the foot is moving away.

As an alternative or in addition, a third indicating element can be activated for the duration of the active holding function so that the driver knows that the vehicle continues to be held in the stopped position despite the release of the brake pedal.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a simplified flow chart of an exemplary process according to the invention using, by way of example, a motor vehicle equipped with an automatic transmission.

DETAILED DESCRIPTION OF THE DRAWING

Referring to FIG. 1, the process begins in Step 100, in which all conditions (driver-side conditions, such as the brake operation, and system-side conditions, such as the charge state of the battery) that are necessary for an automatic turning-off of the internal-combustion engine, are queried. In particular, it is queried whether the vehicle was braked to a stop by a braking operation of the driver.

As soon as the braking of the vehicle to a stop has taken place and all other (system-side) turn-off conditions have been met, in the next Step 110, an LED1 is switched on as a first indicating element. The motor vehicle driver is thereby informed that the internal-combustion engine will be turned off after the expiration of a predefined time interval Tmax unless this is prevented by him. Simultaneously, a timer for monitoring the predefined time interval Tmax (for example, 1 second) will be started in Step 110, within which the driver can prevent the automatic turn-off operation.

Subsequently, in a next Step 120, the time t is queried that has elapsed since the starting of the timer. As long as the time t that has elapsed is shorter than the predefined time interval Tmax, a release of the brake pedal is monitored in a next Step 140. When no releasing of the brake pedal is detected, a return takes place to Step 120, and the time monitoring is continued. As soon as the timer has run out, i.e. the time that has passed since the starting of the timer is longer than the predefined time interval Tmax, the engine is automatically turned off in a known manner in Step 130. Simultaneously, the first LED1 is deactivated and a second display LED2 is activated which informs the driver that the internal-combustion engine was automatically turned off.

When the engine is turned off, a change of the brake pedal operation is monitored in the next Step 135. In particular, it is monitored whether the brake pedal is depressed excessively, thus increasingly depressed for a short time, or whether the brake pedal is released. As soon as the release of the brake pedal is detected when the internal-combustion engine is automatically turned off, the automatic turn-on operation is initiated in Step 136 and the engine is started, for example, by means of a pinion starter. As required—in order to prevent a rolling-away of the vehicle between the point-in-time of the release of the brake pedal and the point-in-time from which the engine generates a drive torque—a so-called auto-hold function can be activated as an automatic holding function for holding the vehicle in the stopped position. As an alternative (not shown here), the holding function can also already be activated when the stoppage is reached in Step 110. Simultaneously, a corresponding indication can be activated in the instrument cluster. In principle, the driver would not notice that the holding function (Auto-Hold) is already active, but the corresponding indication would inform him that, when the brake pedal is released for a restart of the engine, the vehicle (despite a sloping of the road) will not roll away but rather will be held in the stopped position.

After the engine is turned-on, a transition takes place to Step 137. There, the automatically activated holding function is deactivated again as soon as the driver has his foot on the gas pedal and the internal-combustion engine can provide sufficient drive torque M for accelerating the vehicle. The process starts again only when in a last Step 160 the vehicle speed is again greater than approximately zero because of the gas pedal operation.

However, if in Step 135 no release of the brake pedal is recorded but an intensified depressing of the brake pedal occurs, a change takes place from Step 135 to Step 145. A brake pedal release turn-on prevention device is activated there so that, during the subsequent releasing of the brake pedal, no automatic starting of the internal-combustion engine is initiated. The driver can therefore remove his foot from the brake pedal and wait in a relaxed manner until he wants to restart the internal-combustion engine on the basis of the traffic situation. Simultaneously, a so-called auto-hold function is activated as the holding function which, when the brake pedal is released, prevents a rolling away of the vehicle.

Since, as a result of the stepping on the brake pedal, the turn-on demanding device which, in principle, during a release of the brake pedal, when the drive unit is automatically turned off, triggers a starting of the internal-combustion engine, was deactivated or became a turn-on prevention device, not the release of the brake pedal but the operation of the gas pedal will be monitored in the next step. As soon as an operation of the gas pedal is detected, the internal-combustion engine is started again in the next Step 158 and the auto-hold function is deactivated. The process starts again only when in a last Step 160 the vehicle speed is again greater than approximately zero because of the gas pedal operation.

In order to, for example, at stop signs, make it possible for the driver to prevent an automatic turning-off of the internal-combustion engine despite the braking and holding in the stopped position, the driver should be provided within a predefined time interval after coming to a stop with the possibility of preventing the automatic turn-off operation. This is monitored in Step 140. However, if a release of the brake pedal is recognized within the predefined time interval Tmax, it is assumed that the driver does not want an automatic turning-off of the engine. Accordingly, the automatic turning-off of the internal-combustion engine is prevented in Step 150. The internal-combustion engine remains in operation. In order to prevent a rolling-away of the vehicle when the brake is released, the auto-hold function as the holding function, particularly as an automatic brake intervention for holding the vehicle in the stopped position, is activated and a transition takes place to Step 153. As soon it is recognizable that the driver is giving gas again, the automatically activated holding function will be deactivated again. The process starts again only when in a last Step 160 the vehicle speed is again greater than approximately zero because of the gas pedal operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for automatically turning-off and starting an internal-combustion engine in a motor vehicle having a start-stop device that automatically turns off the internal-combustion engine when the vehicle is braked to a stop and held in a stopped position by operation of a brake pedal and automatically turns on the internal-combustion engine upon release of the operated brake pedal, the process comprising the acts of:
automatically turning off the internal-combustion engine when the vehicle is braked to a stop and held in the stopped position by an operation of the brake pedal;
monitoring, after the vehicle has been braked to the stop, whether the brake pedal is additionally depressed excessively and beyond the original operation of the brake pedal for holding the vehicle in the stopped position; and
preventing the automatic starting of the internal-combustion engine based upon the release of the operated brake pedal if said monitoring determines the operated brake pedal was additionally depressed excessively and beyond the original operation of the brake pedal for holding the vehicle in the stopped position while the internal-combustion engine is off.

2. The process according to claim 1, further comprising the act of:
automatically activating a holding function for an automatic holding of the vehicle in the stopped position upon one of the following actions occurring:
a) reaching a stoppage of the vehicle;
b) during the automatic turning-off of the internal-combustion engine; and
c) upon an intensified depressing of the brake pedal when the internal-combustion engine is turned off.

3. The process according to claim 1, further comprising the act of:
activating a holding function for an automatic holding of the vehicle in the stopped position no later than with the release of the operated brake pedal.

4. The process according to claim 1, further comprising the act of:
while preventing the automatic starting of the internal-combustion engine upon release of the operated brake pedal, automatically starting the internal-combustion engine upon operation of a gas pedal or upon detecting a time-proximal operation of the gas pedal via a foot space monitoring device.

5. The process according to claim 2, further comprising the act of:
while preventing the automatic starting of the internal-combustion engine upon release of the operated brake pedal, automatically starting the internal-combustion engine upon operation of a gas pedal or upon detecting a time-proximal operation of the gas pedal via a foot space monitoring device.

6. The process according to claim 3, further comprising the act of:
while preventing the automatic starting of the internal-combustion engine upon release of the operated brake pedal, automatically starting the internal-combustion engine upon operation of a gas pedal or upon detecting a time-proximal operation of the gas pedal via a foot space monitoring device.

7. The process according to claim 2, further comprising the act of:
deactivating the automatically activated holding function when at least one of the following occurs:
a) the automatically turned-off internal-combustion engine is started again;
b) the gas pedal is operated; and
c) the internal-combustion engine provides a sufficient drive torque for holding the vehicle in the stopped position.

8. The process according to claim 3, further comprising the act of:
deactivating the automatically activated holding function when at least one of the following occurs:
a) the automatically turned-off internal-combustion engine is started again;
b) the gas pedal is operated; and c) the internal-combustion engine provides a sufficient drive torque for holding the vehicle in the stopped position.

9. The process according to claim 1, further comprising the act of:
preventing the automatic turning-off of the internal-combustion engine by releasing the brake pedal within a predefined time window.

10. The process according to claim 1, further comprising the act of:
preventing the automatic turning-off of the internal-combustion engine when braking and holding the vehicle in the stopped position by operating the brake pedal within a predefined time window after the stopped position has been reached.

11. The process according to claim 10, further comprising the act of:
when releasing the brake pedal within the predefined time interval after reaching the stopped position, holding the vehicle in the stopped position via a holding function automatically activateable in the stopped position.

12. The process according to claim 1, further comprising at least one of the following acts:
activating a first indicating element when the vehicle has reached the stopped position;
activating a second indicating element when the internal-combustion engine is turned off; and
activating a third indicating element when a holding function is activated.

13. A process according to claim 1, wherein the motor vehicle is equipped with an automatic transmission.

14. A start-stop system for a motor vehicle having an internal-combustion engine and a brake pedal, the system comprising:
a control unit of the start-stop system, the control unit including a memory having programmed therein code segments that:
automatically turn off the internal-combustion engine when the vehicle is braked to a stop and held in the stopped position by operation of the brake pedal;
monitor, after the vehicle is braked to the stop, whether the brake pedal is additionally depressed excessively and beyond the original operation of the brake pedal for holding the vehicle in the stopped position; and
prevent the automatic starting of the internal-combustion engine based upon release of the operated brake pedal if the monitoring determines that the operated brake pedal was additionally depressed excessively and beyond the original operation of the brake pedal for holding the vehicle in the stopped position while the internal-combustion engine was turned-off.

\* \* \* \* \*